United States Patent Office 3,253,957
Patented May 31, 1966

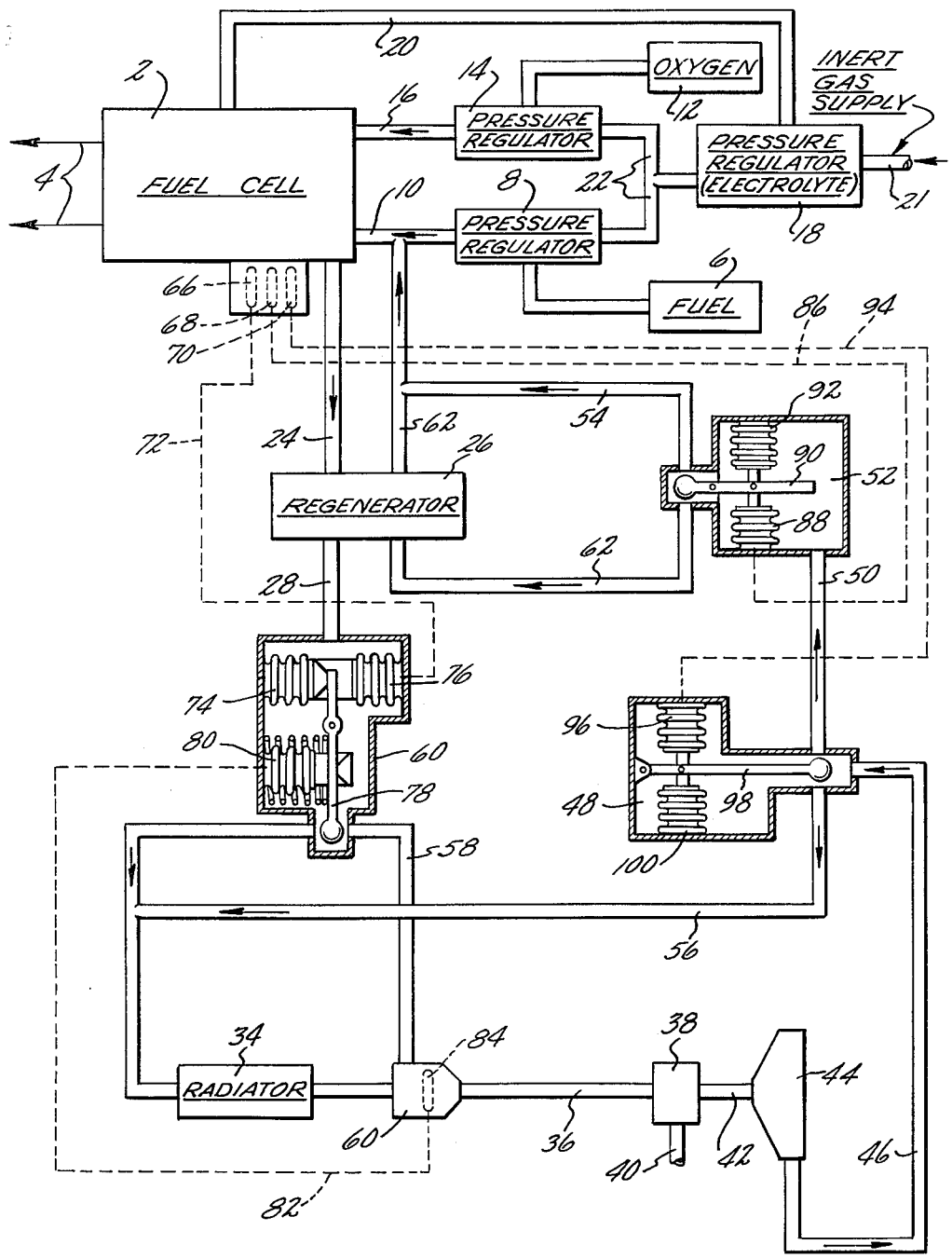

3,253,957
FUEL CELL WITH CONTROL RESPONSIVE
TO TEMPERATURE CHANGES
Albert H. Turner, East Hampton, Stanley L. Leavitt, Simsbury, and Russell A. Thompson, East Hartford, Conn., assignors to United Aircraft Corporation, East Hartford, Conn., a corporation of Delaware
Filed Feb. 28, 1962, Ser. No. 176,346
2 Claims. (Cl. 136—86)

This invention relates to a fuel cell system in which the cell temperature is used to adjust the flow of cooling fluid through the cell. This invention is in some respects an improvement on the copending application of Kunz Serial No. 155,957, filed November 30, 1961, now Patent No. 3,198,664. The invention described herein was made in the performance of work under a NASA contract and is subject to the provisions of the National Aeronautics and Space Act of 1958, Public Law 85–568 (72 Stat. 426; 42 U.S.C. 2451), as amended.

One feature of the invention is the control of the volume of cooling fluid as a function of cell temperature. Another feature is the use of an excess of fuel as a cooling fluid and controlling the quantity and/or temperature of the returned fluid as a function of cell temperature.

Another feature is the maintenance of the desired cell output by maintaining the operating temperature of the cell, since the cell output is a function of temperature. Another feature is the adjustment of the flow and temperature of the cooling fluid in order to maintain desired cell output.

Other features and advantages will be apparent from the specification and claims, and from the accompanying drawing which illustrates an embodiment of the invention.

The single figure is a diagrammatic view of the system.

As shown in the drawing, the fuel cell 2 has output leads 4 from which electrical power is derived from the cell. A fuel, which in the particular arrangement is hydrogen, is supplied from a source 6 through a pressure regulator 8 and a supply duct 10 to the fuel cell. Similarly, the oxidant is supplied under pressure from a source 12 through a pressure regulator 14 and a supply duct 16 to the fuel cell.

The pressure within the fuel cell, which would be the pressure of the electrolyte, is controlled by a pressure regulator 18 which is connected with the cell by a conduit 20. This pressure regulator operates to supply inert gas from a supply pipe 21 under a controlling pressure to regulators 8 and 14 through conduits 22. The arrangement is such as to assure a supply of fuel and oxidant through the supply ducts 10 and 16 at a pressure slightly higher than the electrolyte pressure. In this way the flow of the fuel and oxidant into the cell is assured and the proper interaction of fuel, oxidant and electrolyte will occur in the electrodes.

More fuel is circulated through the cell than will be utilized within the fuel cell and the excess of circulated fuel carries therewith some of the exhaust products of the fuel cell. In this particular cell the excess product is water vapor which discharges through an exhaust conduit 24. This excess fuel and water vapor passes through a heat exchanger 26 or preheater and thence through a conduit 28 to a radiator 34. From the radiator which serves to condense the water vapor, the exhaust products are delivered through a conduit 36 to a water separator 38. In the separator the water is removed from the excess fuel and discharged through a conduit 40. From the water separator the excess fuel passes through a conduit 42 to a pump 44 and through a conduit 46 to a flow control valve 48. From valve 48 the excess fuel goes through a conduit 50 to another control valve 52 and thence through a duct 54 to the supply conduit 10. From the flow control valve 48 there is a bypass conduit 56 communicating with the duct 28 upstream of the radiator so that some of the excess fuel may be diverted by the control valve 48 into the conduit 56 and thence back into the radiator.

From the conduit 28 there is also a bypass duct 58 which permits a radiator bypass valve 60 to bypass part or all of the exhaust products around the radiator 34 under certain conditions.

The valve 52 is arranged to divert part of the excess fuel from the duct 54 and direct it instead to a conduit 62 which passes the excess fuel through the heat exchanger 26 and thence back to the conduit 54 downstream of the valve 52.

In operation, the fuel cell normally operates with the exhaust products mixed with the excess fuel passing through the heat exchanger 26 to be cooled and thence through the radiator 34 where, by further cooling, the water vapor is condensed to a liquid. As the pump removes the products from the radiator, the water is removed by the separator 38 and the excess fuel passes through the valves 48 and 52 and through the return conduit 54 to the cell through the fuel supply conduit 10.

The flow through the system is controlled as a function of the temperature of the cell since by holding the temperature constant the cell will produce a constant electrical output at least for a predetermined time. To accomplish this the cell temperature is sensed by three temperature sensing elements 66, 68, and 70 which in the arrangement shown are fluid expansion temperature sensors. The device 66 is connected by a lead 72 to a bellows 76 forming a part of the valve 60. The bellows 76 is mounted in opposition to bellows 74 and acts upon the stem of a pivotally mounted valve element 78 the function of which is to control the quantity of cooling fluid bypassing the radiator 34 through the conduit 58.

The position of the valve element 78 is additionally controlled by another bellows 80 which is connected through a conduit 82 to a temperature sensing element 84 in the conduit 36 to the pump. Thus the valve element 78 is moved in such a direction as to increase the flow of cooling fluid through the radiator as the temperature of the fuel cell increases and is also moved to adjust the flow through the bypass conduit 58 as a function of the temperature entering the water separator and pump.

The temperature sensing device 68 is connected by a conduit 86 to a bellows 88 acting on the pivotally mounted valve element 90 of the bypass control valve 52. The bellows 88 is opposed by a sealed bellows 92. Thus as the temperature of the fuel cell increases the bypass conduit 54 is opened to a greater extent so that less of the cooling fluid will pass through the regenerator 26.

The third temperature sensing device 70 is connected by a conduit 94 to a bellows 96 acting on the pivotally mounted valve element 98 of the flow control valve 48. The bellows 96 is opposed by a sealed bellows 100. As the fuel cell temperature increases the valve element 98 is moved to increase the flow of fluid through the conduit 50 and to decrease the flow of fluid through the bypass conduit 56 back to the radiator 34.

It will be understood that the excess fuel is used both for cooling the fuel cell and for removing the water vapor accumulating in the cell as the cell operates. If the cell is operating at higher than the established temperature the control or temperature sensor 68 will cause adjustment of the valve 52 to pass less of the excess fuel through the heat exchanger so that the excess fuel entering the supply pipe 10 will be at a lower temperature and will provide more cooling of the cell. At the same time the valve 98 will also be adjusted to decrease the quantity of excess fuel returned to the radiator through the conduit 56 thereby increasing the amount of fuel returned to the supply pipe 10 thereby providing for additional fuel cell cooling. The valve 60 obviously permits control of the effectiveness of the radiator 34 thereby determining the cooling effect of the radiator on the excess fuel.

The system by which the pressure of the oxidant and fuel is adjusted with respect to the electrolyte is well known. It is described in this application to indicate that a pressure regulation is contemplated by which to assure effective operation of the cell.

It is to be understood that the invention is not limited to the specific embodiment herein illustrated and described, but may be used in other ways without departure from its spirit as defined by the following claims.

We claim:

1. In a fuel cell control device, a fuel cell, means for supplying oxidant and fuel under pressure to said cell, a discharge conduit for the mixed products of oxidation and excess fuel from said cell, a heat exchanger through which said mixed products are directed for cooling said products, a separator for removing the products of oxidation from the excess fuel, a pump for the excess fuel, a conduit from said pump to the heat exchanger and thence to the cell for returning the excess fuel from the separator through the heat exchanger in heat exchange relation to said mixed products to the cell, a bypass conduit around the heat exchanger for bypassing a portion of the fuel directly from the pump to the cell, temperature sensing means responsive to the temperature of the cell and a single valve means actuated by said temperature sensing means and responsive to temperature changes in the cell for controlling the amount of fluid bypassing and passing through the heat exchanger.

2. A device as in claim 1, including a radiator between the heat exchanger and the separator, a return bypass around said pump and radiator and valve means movable in response to the changes in cell temperature for controlling the flow to said return bypass.

References Cited by the Examiner

UNITED STATES PATENTS

| 2,901,524 | 8/1959 | Gorin | 136—86 |
| 3,002,039 | 9/1961 | Bacon | 136—86 |
| 3,008,515 | 11/1961 | Wente | 137—100 X |

ALLEN B. CURTIS, *Primary Examiner.*

JOHN R. SPECK, WINSTON A. DOUGLAS, *Examiners.*

H. FEELEY, *Assistant Examiner.*